United States Patent [19]
Geyer

[11] Patent Number: 5,618,026
[45] Date of Patent: Apr. 8, 1997

[54] HYBRID ROTARY CONTROL VALVE ASSEMBLY

[75] Inventor: Craig Geyer, St. Cloud, Minn.

[73] Assignee: General Signal Corporation, Stamford, Conn.

[21] Appl. No.: 387,275

[22] Filed: Feb. 13, 1995

[51] Int. Cl.⁶ .............................. F16K 1/16; F16K 5/00
[52] U.S. Cl. .......................... 251/298; 251/314; 251/363
[58] Field of Search ..................... 251/298, 304, 251/314, 363

[56] References Cited

U.S. PATENT DOCUMENTS

| | | | |
|---|---|---|---|
| 2,803,426 | 8/1957 | De Zurik | 251/301 |
| 3,064,940 | 11/1962 | Anderson et al. | 251/249.5 |
| 3,254,872 | 6/1966 | Roos | 251/163 |
| 3,379,408 | 4/1968 | Lowrey | 251/298 |
| 3,520,513 | 7/1970 | Okerblom | 251/208 |
| 3,674,238 | 7/1972 | Pickles et al. | 251/309 |
| 3,880,191 | 4/1975 | Baumann | 251/298 X |
| 4,118,008 | 10/1978 | Meyers | 251/298 |
| 4,121,607 | 10/1978 | Bader | 251/298 X |
| 4,640,492 | 2/1987 | Carlson, Jr. | 251/298 X |
| 4,863,144 | 9/1989 | Wilson et al. | 251/298 X |
| 5,170,992 | 12/1992 | Lenberg | 251/304 |

OTHER PUBLICATIONS

DeZurik Corporation, "DeZurik K–Max Rotary Control Valves", Bulletin 58.00–1 (Nov. 1989).

*Primary Examiner*—Hoang Nguyen
*Attorney, Agent, or Firm*—Ohlandt, Greeley, Ruggiero & Perle

[57] ABSTRACT

There is provided a hybrid rotary control valve for use on existing rotary concentric control valve, or ball valve, platforms. In particular, the hybrid rotary control valve comprises a concentric valve chamber, adjustable valve seat, eccentric control valve plug, and retainer. In addition, a flexible seal or ring is situated between the adjustable valve seat and retainer to provide adjustable positioning of the adjustable valve seat when installed about a flow channel of the valve chamber and dynamic adjusting of the adjustable valve seat when engaged and disengaged by the eccentric control valve plug. Further, the adjustable valve seat includes an orifice that is offset from the center axis of the valve seat. By rotating the position of the valve seat, the flow characteristic of the control valve may be adjusted in an economical and efficient manner.

18 Claims, 7 Drawing Sheets

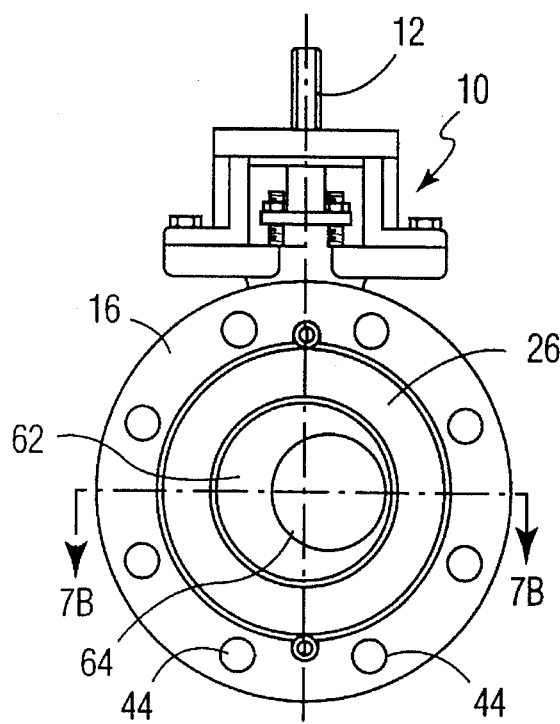
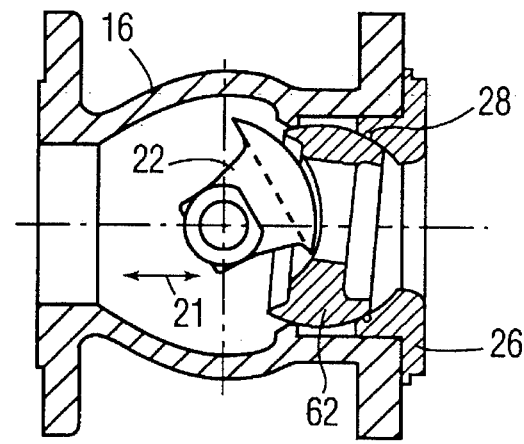
FIG. 7A  FIG. 7B
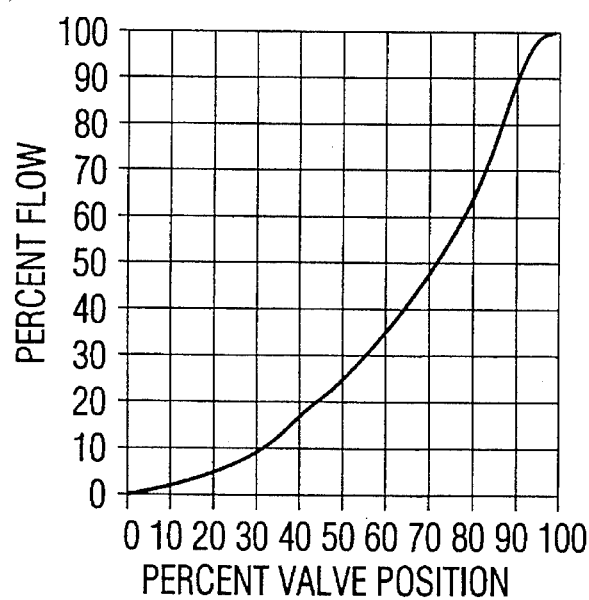
FIG. 7C

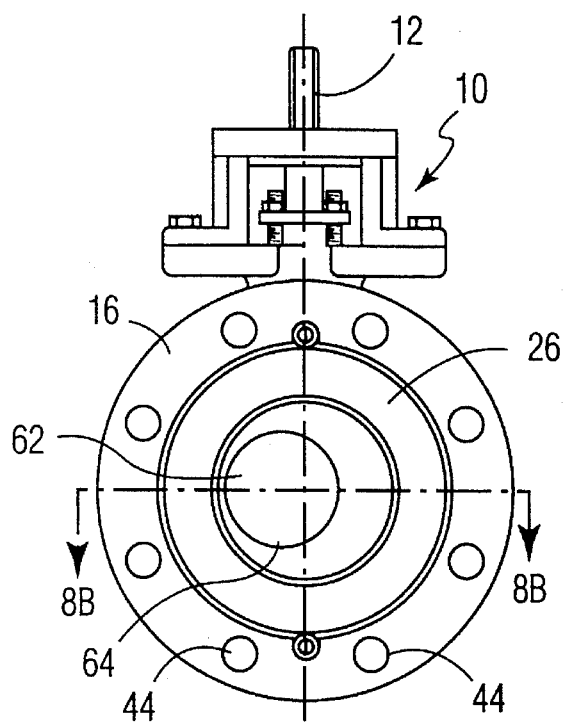
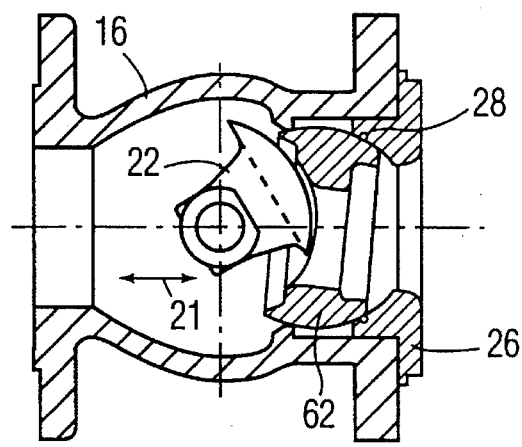
FIG. 8A
FIG. 8B
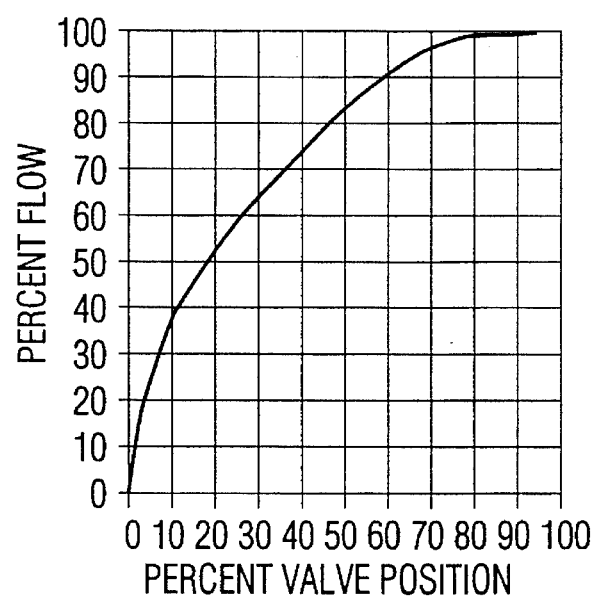
FIG. 8C

HYBRID ROTARY CONTROL VALVE ASSEMBLY

The present invention relates generally to a unique hybrid rotary control valve which is capable of controlling the flow of liquids and gases. More particularly, the present invention relates to a hybrid rotary control valve, which incorporates features of both concentric and eccentric control valves, that are designed for precise throttling control of liquids and gases passing in either flow direction of the valve.

BACKGROUND OF THE INVENTION

There are two general types of rotary control valves: rotary concentric control valves, i.e., ball valves, and rotary eccentric control valves, i.e., plug valves. Both types of rotary control valves include a valve plug, having a plug head and plug body, that rotates toward and away from a valve seat. By covering and uncovering an orifice of the valve seat with the plug head of the valve plug, the rotary control valve is capable of controlling the flow of liquids and gases through the orifice. For a concentric or ball valve the shape of the valve plug is such that the plug head is centered with respect to a valve shaft which is centrally disposed about the centerline of the valve chamber. In contrast, an eccentric or plug valve positions the plug head such that it is offset relative to the valve shaft which itself is offset from the centerline of the valve chamber. Eccentric valves are designed so that the valve plug leaves contact with the seat immediately upon the start of opening.

It is known that the performance of a concentric valve degrades quickly due to the friction that occurs between the front surface of its plug head and the inner engaging surface of its valve seat. In particular, the plug head continually rubs against the valve seat during engagement and disengagement due to the concentric configuration of the valve plug and shaft. This rubbing action causes or tends to cause excessive wear to occur between the contacting surfaces of the valve plug and valve seat and, thus, increases leakage therebetween. In addition, this rubbing action causes the concentric valve assembly to apply a high amount of torque during the opening and closing of the concentric valve assembly as wear occurs.

In contrast, rotary eccentric control valve assemblies enable the plug head to pull away from the valve seat as it rotates in unison with the shaft. To accomplish this, eccentricity is built into the valve assembly. Conventional eccentric control valves accomplish this by building the eccentricity into the valve chamber and locating the spherical radius of the plug from the centerline of the valve chamber. This results in a functional design but large capital investments must be made to manufacture the product. Thus, eccentric valves do not suffer from the rubbing problem normally associated with concentric or ball valves. For example, U.S. Pat. No. 4,118,008, which issued on Oct. 3, 1978 to E. B. Myers, entitled ROTARY VALE, provides an eccentric plug assembly situated within a valve chamber having a plug head that is offset from a plug body. The plug head is offset from the valve body in order to compensate for the fact that the valve shaft about which the valve plug is disposed is itself offset from the centerline of the valve chamber. The displacement of the plug head and plug body enables the surface of the plug head to move away from an orifice of a valve seat at a steep angle. Thus, the plug head does not rub continually against the valve seat as it rotates within the valve chamber.

A rotary eccentric control valve having a plug body that is centered within the valve chamber is also known. For example, U.S. Pat. No. 3,379,408, which issued on Apr. 23, 1968 to W. E. Lowmy, entitled ECCENTRIC PLUG VALVE, provides an eccentric plug assembly having a plug head which is offset with respect to the valve shaft which is centrally disposed within the valve chamber. The problem with this patent is that the flow channel or orifice has also been offset with respect to the valve shaft so that the plug head is centrally disposed within the flow channel or orifice.

Another example is described in U.S. Pat. No. 2,803,426, which issued on Aug. 20, 1957 to D. De Zurik, entitled VALVES that provides a rotary plug assembly having a plug body disposed about a valve shaft that is centered within a valve chamber and a unique plug head which is centered (i.e., not offset) with respect to the valve shaft, but rather has different radius lengths at opposite ends of the plug head with respect to the valve shaft. This Patent also requires that one side of the valve seat be built up with respect to the other so as to accommodate the plug head having a decreasing thickness. Also, both of these patents describe immovable valve seats that are an integral part of the valve chamber. The valve seats are uniquely and unevenly formed within the valve chamber to accommodate the positions of the plug heads.

A vast majority of existing production machinery are designed to produce rotary concentric control valves that center the valve, shaft, valve plug and valve seat within the rotary concentric chamber. It would therefore be highly desirable if these readily available rotary concentric control valves could be modified to incorporate the non-rubbing benefits associated with eccentric control valves. There have been various attempts at modifying conventional rotary concentric control valves to incorporate the valve plug assemblies normally associated with rotary eccentric control valves, but these modifications typically require the removal of the centrally positioned valve shaft of the concentric control valve and replacing it with a new valve shaft which is offset from the centerline of the valve chamber and flow channel. This procedure is labor intensive and requires numerous new tooling, casting and molding for such modifications and, thus, is not economical for most situations. This has caused valve manufacturers to either cast completely new eccentric control valves or retrofit existing concentric control valves, as discussed above. Either of which is expensive and undesirable.

In order to overcome the above-mentioned disadvantages of the prior art, the present invention has uniquely created a hybrid rotary control valve which utilizes (a) the valve chamber of a conventional rotary concentric control valve having the valve shaft centrally disposed within its valve chamber, and (b) a valve plug having a plug head which is offset with respect to the valve shaft and flow channel such as the valve plugs used in conventional rotary eccentric control valves, thereby obtaining substantial cost savings over retrofitted concentric valves or newly cast rotary eccentric control valves. The present invention also has a removable and replaceable dynamic valve seat that may be situated within an existing conventional rotary concentric valve chamber which can be manufactured by existing production machinery and yet adapt and compensate for the offset position of the plug head to form a leak-tight fit between the valve seat and the plug head. It is also desirable that the hybrid rotary control valve of the present invention provides a multitude of flow characteristics without adding to manufacturing and product cost.

Use of a dynamic orbital valve seat dramatically reduces the torque required to shutoff the valve. The torque reduction has a positive impact on reducing valve cost. The shaft size of the valve can be reduced as well as the size of the valve plug. These items are typically high alloy materials which are expensive to purchase. By down sizing these components, less material is used resulting in cost savings. Another benefit of the lower torque is that smaller actuators can be used to actuate the valve. This also results in substantial cost savings.

The valve torque reduction allows the use of a two piece shaft design, i.e., an upper splined end and a lower end of a shaft. Typically, existing rotary eccentric control valves use a one piece shaft that extends through the valve chamber since such a shaft is necessary to carry high torque loads. Such a one piece shaft protrudes into the flow passage of the valve chamber and reduces flow capacity. The two piece shaft does not protrude into the flow passage resulting in a 50% or greater increase in flow capacity of the hybrid rotary control valve.

SUMMARY OF THE INVENTION

The present invention, in brief summary, is a hybrid rotary control valve assembly which comprises a concentric valve body having a concentric valve chamber, a shaft disposed within the concentric valve chamber, and a flow channel disposed within a side wall of the concentric valve chamber. The present invention also comprises an adjustable valve seat disposed about the flow channel wherein the adjustable valve seat has an orifice disposed therein. The present invention further comprises an eccentric control valve plug assembly having a plug body and a plug head, the plug body having first and second end portions, wherein the first end portion of the plug body is disposed about the shaft whose axis of rotation intersects with a centerline of the flow channel, and wherein the plug head is disposed about the second end portion of the plug body which is opposite to the shaft and in such a way that it is offset with respect to the centerline of the flow channel, wherein the plug head engages the adjustable valve seat in a liquid or gas tight relationship when in the closed position.

The plug head preferably has a curved surface which is capable of engaging the adjustable valve seat in the fluid or air tight relationship when the plug head is disposed at an angle relative to the centerline of the flow channel.

Preferably, the plug head further forms an acute angle relative to the centerline of the flow channel to center the plug head in the flow channel. The acute angle is about 1 degree to about 60 degrees.

The present invention still further provides that the adjustable valve seat rotates orbitally about the flow channel so that the adjustable valve seat aligns with the eccentric control valve plug.

BRIEF DESCRIPTION OF THE DRAWINGS

FIG. 7A is a cross-sectional view along line 7A—7A of FIG. 5, in which the constricted orifice of the valve seal is positioned at 90 degrees from the top of the flow channel;

FIG. 7B is a cross-sectional view of the valve body along line 7B—7B of FIG. 7A;

FIG. 7C is a flow characteristic graph plotting percent flow versus percent valve position the second embodiment as shown in FIG. 5, when the orifice is at 90 degrees;

FIG. 8A is a cross-sectional view along line 8A—8A of FIG. 5, in which the constricted orifice is positioned at 270 degrees from the top of the flow channel;

FIG. 8B is a cross-sectional view of the valve body along line 8B—8B of FIG. 8A; and FIG. 8C is a flow characteristic graph plotting percent flow versus percent valve position for the second embodiment as shown in FIG. 5 when the orifice is at 270 degrees.

DETAILED DESCRIPTION OF THE PREFERRED EMBODIMENT

Figure 1:
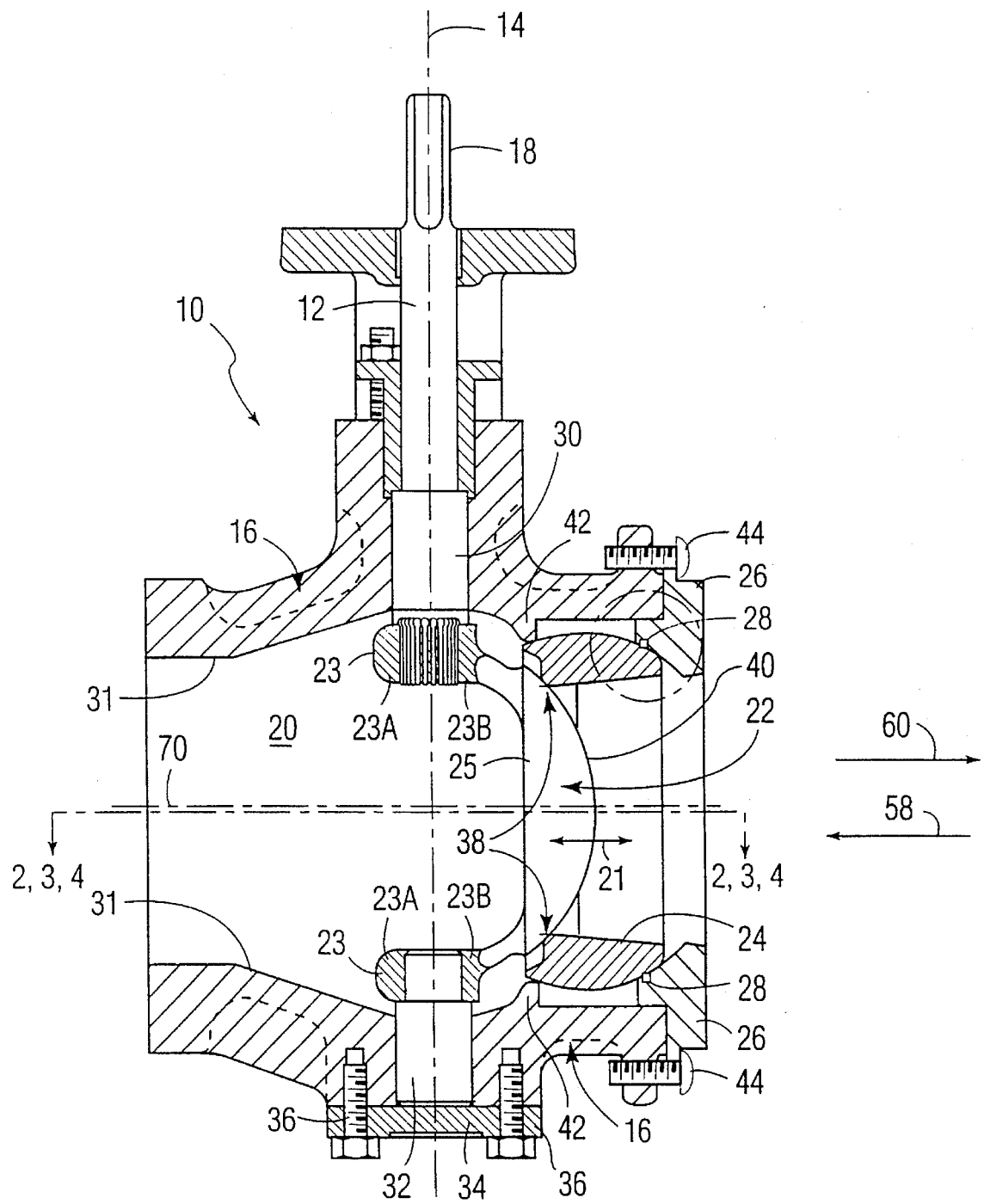
FIG. 1 is a vertical cross-sectional view of a rotary eccentric control valve assembly of one embodiment of the present invention.

Referring to the drawings and, in particular, to FIG. 1, there is provided a hybrid rotary control valve assembly which is generally represented by reference numeral 10. Hybrid rotary control valve assembly 10 is designed for precise throttling control of elements, i.e., liquids and gases, passing in either flow direction, i.e., flow-to-open 58 and flow-to-close 60 directions, of the valve. Such liquids and gases include high or low pressure steam, viscous or corrosive liquids, sludge or abrasive slurries, and other types of clean, dirty or corrosive materials.

Rotary control valve assembly 10 includes a concentric valve body 16 including a concentric or ball valve chamber 20 having a shaft 12 which is located on a vertical axis of rotation 14 of concentric valve chamber 20. Shaft 12 is rotatably mounted within valve body 16. An upper end 18 of shaft 12 may be rotated about its axis by any type of rotating means or actuator, such as a hydraulic link and arm combination or an electrical step motor. In addition, a flow passage or channel 21 is disposed within the inner side wall 31 of valve body 16.

Referring to FIG. 1, the present invention has at least three unique components within concentric valve chamber 20 that replace corresponding components on conventional rotary concentric control valves: an eccentric control valve plug assembly 22, adjustable valve seat 24 and retainer 26. Also, a flexible seal or ring 28 that is wedged between adjustable valve seat 24 and retainer 26 is unique to the embodiments of the present invention. Further, as will be discussed below, shaft 12 is preferably separated into two portions within concentric valve chamber 20.

Eccentric control valve plug assembly 22 has a plug body 23 and plug head 25. A first end portion 23A of plug body 23 is disposed about shaft 12 whose axis of rotation 14 intersects with a centerline 70 of flow channel 21. Plug head 25 is disposed about a second end portion 23B of plug body 23 which is opposite to the shaft 12 and in such a way that it is offset with respect to centerline 70. In addition, eccentric control valve plug assembly 22 is supported within concentric valve chamber 20 by an upper serrated or splined end 30 and a lower end 32 of shaft 12. By removing a lower face plate 34 secured to the bottom of valve body 16 via bolts 36, lower end 32 of shaft 12 may be removed to make room for valve plug assembly 22. Then, valve plug assembly 22 may be connected to upper splined end 30 of shaft 12 and secured within concentric valve chamber 20 by repositioning lower end 32 of shaft 12 and lower face plate 34. Although any type of connection may be used to connect shaft 12 to valve plug assembly 22, the connection must be strong enough to transfer any torque applied to the shaft to valve plug assembly 22.

Adjustable valve seat 24 is preferably disposed about and within flow passage or channel 21 of concentric valve chamber 20 so that a sealing orifice 38 of adjustable valve seat 24 circumferentially contacts spherical sealing surface 40 of plug head 25 of valve plug assembly 22. This contact or engagement between sealing surface 40 of valve plug assembly 22 and sealing orifice 38 of valve seat 24 must be gas and liquid tight in order to provide reasonable shut off over air and fluids that pass through concentric valve chamber 20.

the other side of valve seat 24, retainer 26 supports flexible ring 28 against valve seat 24. Due to the inner contours of retainer 26, valve seat 24 makes little or no contact with retainer 26 and is supported predominantly by flexible ring 28 on that side. In turn, retainer 26 is rigidly supported against valve body 20 by at least two bolts 44.

Figure 2:
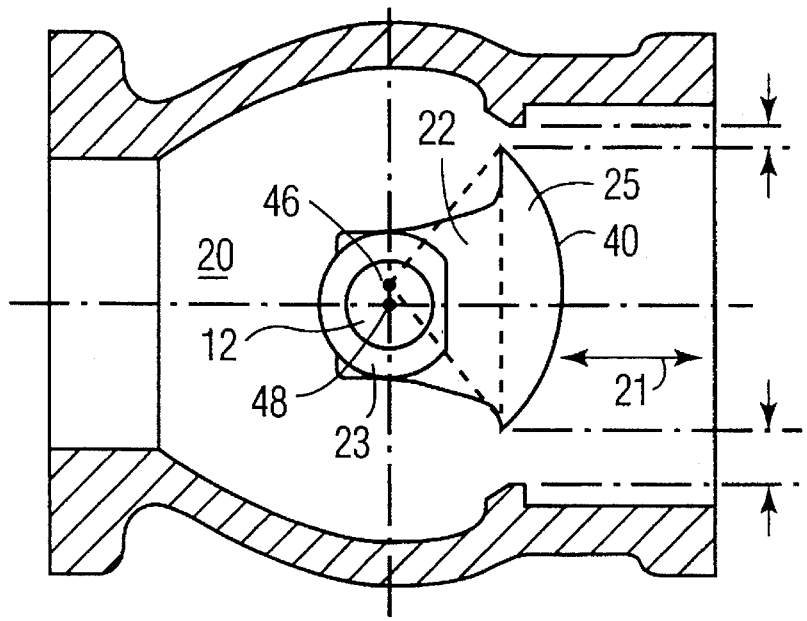
FIG. 2 is a cross-sectional view along line 2—2 of FIG. 1 of the valve body and valve plug assembly without the valve seat, showing the valve plug head at a perpendicular position with respect to the shaft when the valve assembly is partially closed.

FIG. 2 depicts the unique shape of valve plug assembly 22 and its eccentricity. A point of reference or center point 46 of the spherical sealing surface 40 of the valve plug is located offset from center point 48 of the shaft. This eccentric configuration permits valve plug assembly 22 to leave contact with valve seat 24 (shown in FIG. 4) immediately or soon after rotating valve plug assembly 22 in the counter-clockwise direction. The contact between valve plug assembly 22 and valve seat 24 are discussed in more detail below in reference to FIG. 4. However, for the position shown in FIG. 2, shaft 12 is centered in concentric valve chamber 20 whereas sealing surface 40 of valve plug assembly 22 is not centered within flow channel 21 of hybrid rotary control valve 10.

Figure 3:
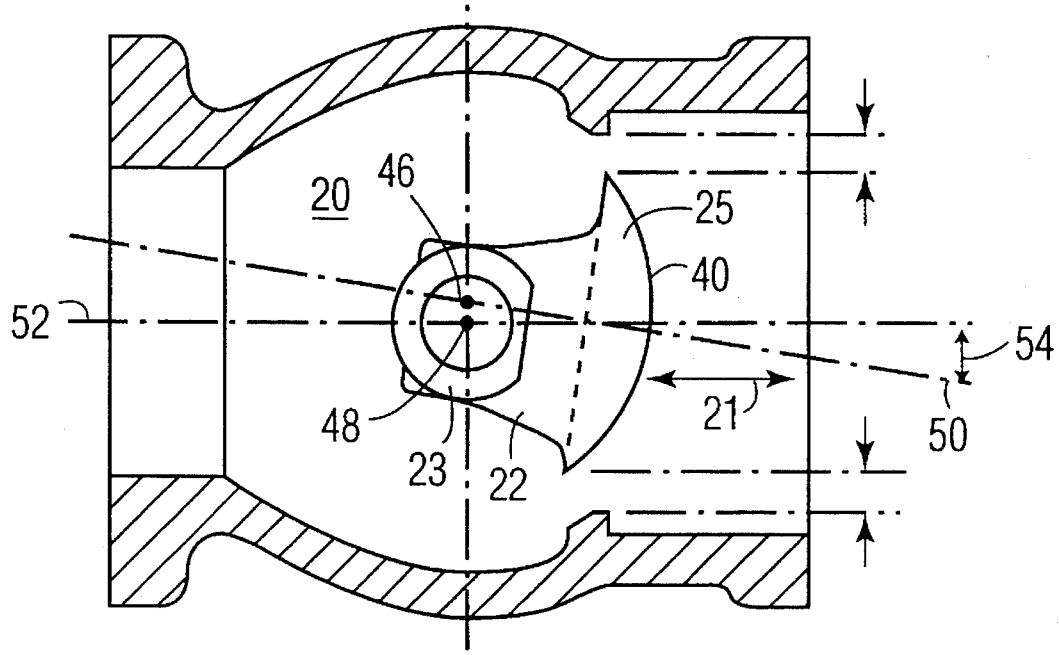
FIG. 3 is another cross-sectional view along line 3—3 of FIG. 1 of the valve body and valve plug assembly, without the valve seat, showing the valve plug head at a slightly angled position compared to FIG. 2 when the valve assembly is completely closed.

FIG. 3 demonstrates that valve plug assembly 22 is centered in flow passage or channel 21 by rotating it clockwise to a different position until it is approximately centered in the flow passage of concentric valve chamber 20. When valve plug assembly 20 is off-centered within flow channel 21, as shown in FIG. 2, it is not in a liquid or gas tight relationship with its associated valve seat 24. In order to create gas or liquid tight seal between plug head assembly 22 and valve seat 24 it is required in accordance with the present invention for plug assembly 22 to be rotated from its off-centered position within flow channel 21 to an angled and centered position with respect to flow channel 21, as shown by angled line 50. Preferably, acute angle 54 formed between centerline 52 and angled line 50 ranges from about 1 degree to about 60 degrees and, more preferably, about 5 degrees to about 7 degrees.

Figure 4:
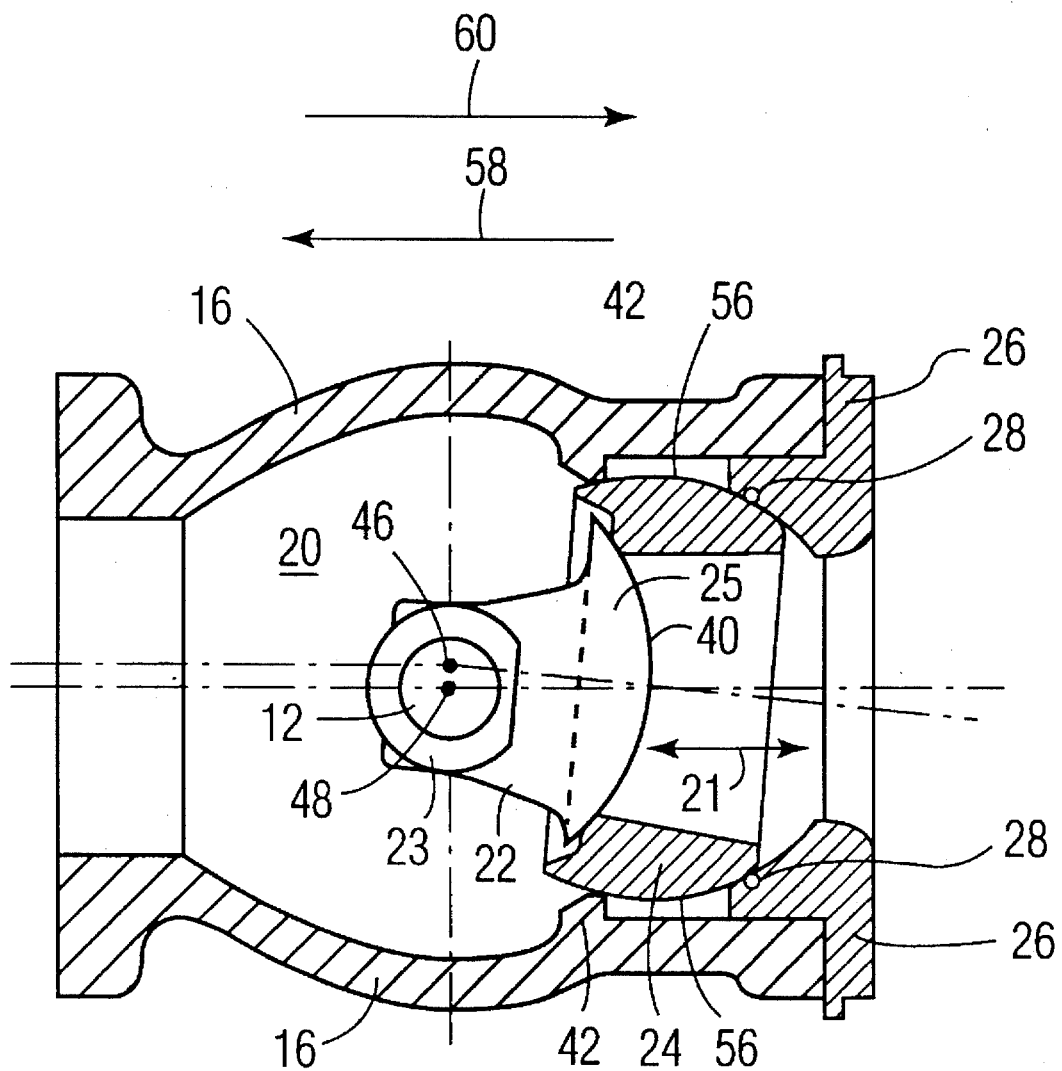
FIG. 4 is a cross-sectional view along line 4—4 of FIG. 1, showing the valve seat relative to the position of the valve plug head when the valve plug assembly is at a slightly angled position compared to FIG. 2 when the valve assembly is completely closed.

FIG. 4 depicts a spherical outside surface 56 of adjustable valve seat 24 which is situated in concentric valve chamber 20. For the most part, valve seat 24 comes to rest on the circumference of flange 42 of valve body 16 and flexible ring 28 which is supported by retainer 26. Further contact is made with sealing surface 40 of valve plug assembly 22. Flange 42, flexible ring 28 and sealing surface 40, in combination, serve as a rotational guide for spherical outer surface 56 of valve seat 24. Because of the spherical shape of sealing surface 40 and outer surface 56, valve plug assembly 22 and valve seat 24 simply self align. Final adjustment to achieve shutoff or sealing between valve seat 24 and valve plug assembly 22 is accomplished by slight rotation of plug 22 and seat 24 which allow them to find their preferred seal position. Once valve plug assembly 22 and valve seat 24 have found their preferred seal position with each other, retainer 26 is positioned into concentric valve chamber 20 and holds flexible ring 28 against valve seat 24.

The control valve configuration shown in FIG. 4 provides for movement of adjustable valve seat 24 upon closure of valve plug assembly 22 against valve seat 24. This is accomplished by suspending valve seat 24 between flanges 42 of valve body 16 and a flexible seal or ring 28, such as an o-ring or metal "C" ring, as described above. When valve plug assembly 22 is rotated in valve seat 24 it moves slightly in an axial direction. When this occurs, valve seat 24 moves from flange 42 of valve body 16, freeing valve seat 24 to rotate in an orbital fashion. This orbital movement permits valve seat 24 to align itself with valve plug assembly 22. At the same time, the upstream pressure acts upon valve seat 24, forcing it into valve plug assembly 22. This particular sequence of events occurs each time hybrid rotary control valve 10 closes and permits valve seat 24 and valve plug assembly 22 to compensate for normal movement and wear of valve components. Thus, the present invention provides a highly reliable, pressure assisted, dynamic orbital valve seat seal that provides optimum shutoff and dramatically reduced valve operating torque.

The dynamic orbital valve seat design, as described above, improves shutoff capabilities of the hybrid rotary control valve. This improved shutoff results from the ability of valve seat 24 to move axially and to rotate in an orbital manner within concentric valve chamber 20 upon valve closure. The movement by valve seat 24 allows valve plug assembly 22 and valve seat to self-align themselves with each other during valve closure. Dynamic orbital valve seat 24 also allows the gas or fluid pressure of the passing gas or liquid to assist in sealing control valve 10 in flow-to-open direction 58, as opposed to a flow-to-close direction 60, as shown in FIG. 4. The end result of these features is vastly improved shutoff capability for this hybrid rotary control valve design.

Testing was performed and results were obtained for hybrid rotary control valve 10 to determine the torque required to achieve shutoff of valve seat 24. One of these tests was performed using a 4 inch hybrid rotary control valve of the type above described using a power actuator. The results are set forth below in Tables A and B:

TABLE A

FLOW TO OPEN DIRECTION
TORQUE REQUIRED TO SHUT-OFF VALVE
(TEST MEDIA WATER)

| DELTA P† (PSI) | TORQUE (FT-LBS) | LEAKRATE* (ML/MIN) |
|---|---|---|
| 0 | — | |
| 50 | — | |
| 100 | — | |
| 150 | 53 | 19 |
| 200 | — | |
| 250 | 72 | 25 |
| 300 | — | |
| 350 | 94 | 29 |
| 400 | — | |
| 450 | 109 | 33 |
| 500 | — | |
| 550 | 126 | 36 |
| 600 | — | |
| 650 | 147 | 39 |
| 700 | — | |
| 750 | 173 | 43 |

†Delta P is the pressure differential from one side of the valve to the other.
*1% of that allowed by ANSI CLASS IV.

TABLE B

FLOW TO CLOSE DIRECTION
TORQUE REQUIRED TO OPEN VALVE
(TEST MEDIA WATER)

| DELTA P† (PSI) | TORQUE (FT-LBS) | LEAKRATE* (ML/MIN) |
|---|---|---|
| 0 | — | |
| 50 | — | |
| 100 | — | |
| 150 | 38 | * |
| 200 | — | |
| 250 | 57 | * |
| 300 | — | |
| 350 | 72 | * |
| 400 | — | |
| 450 | 90 | * |
| 500 | — | |
| 550 | 121 | * |
| 600 | — | |
| 650 | 128 | * |
| 700 | — | |
| 750 | 141 | * |

†Delta P is the pressure differential from one side of the valve to the other.
*Less that 1% of that allowed by ANSI CLASS IV.

As noted above the present invention improves the sealability of conventional rotary eccentric control valves and reduces seating torque by as much as 50%. A typical 4 inch rotary eccentric control valve requires a substantial amount of torque to shut-off the valve. For example, it is required to use about 230 ft.-lbs. to shutoff a valve subject to a pressure differential of 450 psi. However, in Table A above, the 4 inch hybrid rotary control valve according to the present invention requires only 109 ft.-lbs. to shutoff the same (450 delta p), due in part to its unique dynamic orbital valve seat design. Thus, sealability is vastly improved by the dynamic movement of valve seat 24 of the present invention.

Figure 5:
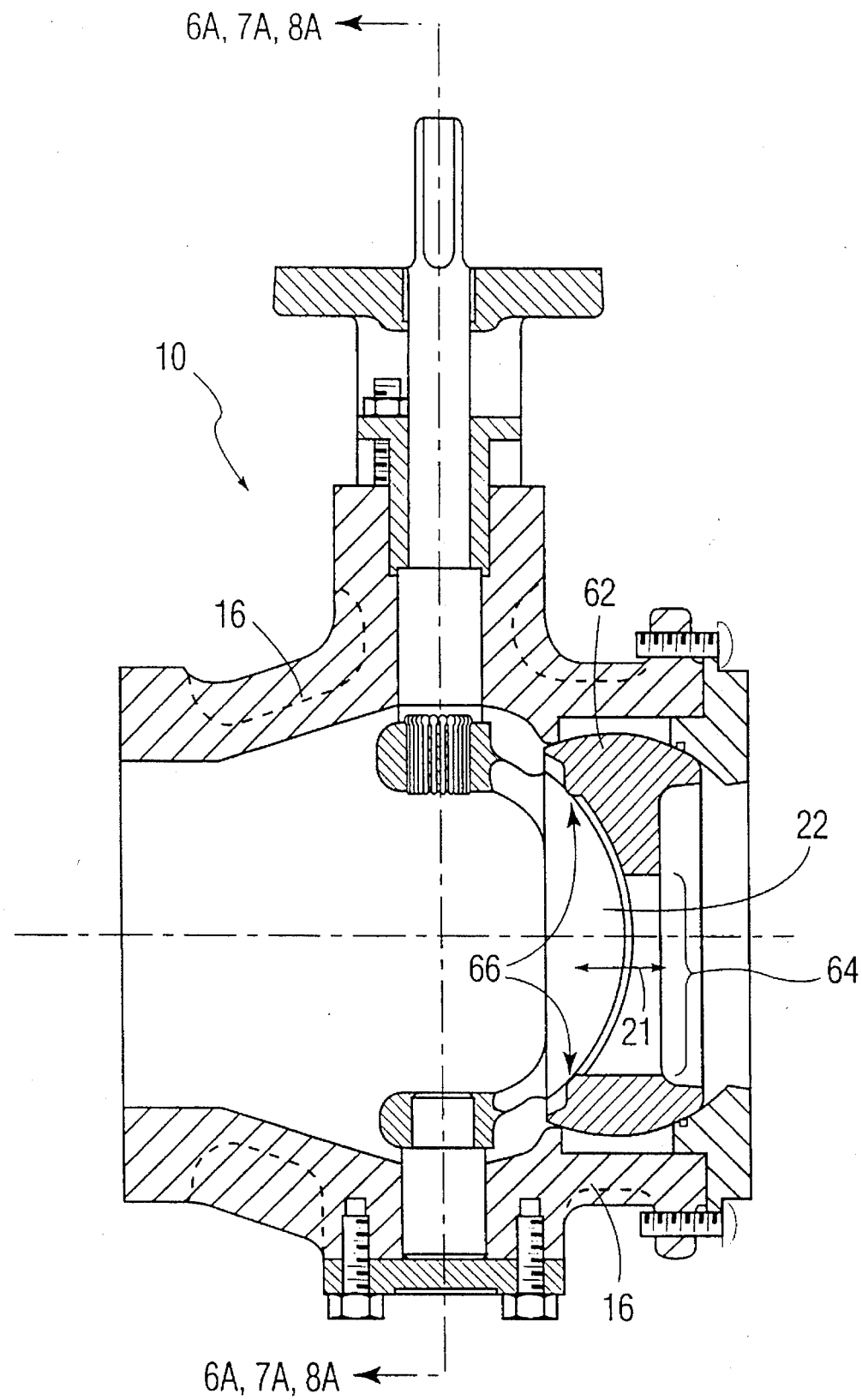
FIG. 5 is a vertical cross-sectional view of the rotary eccentric control valve assembly according to another embodiment of the present invention having a dynamic valve seal positioned at 180 degrees from the top of the flow channel.

FIG. 5 depicts another embodiment &hybrid rotary control valve 10 according to the present invention that provides multiple flow characteristic. An adjustable flow characteristic valve seat 62 is utilized to adjust the flow characteristics of hybrid rotary control valve 10 to provide the best suited flow characteristics for a particular process. By simply rotating valve seat 62 within valve body 16, the desired flow characteristic is chosen.

The above described flow characteristic adjustment is achieved without changing or adding additional parts. The adjustable flow characteristic seat comprises of an offset sealing orifice 64 located inside an abutting ring 66 of valve seat 62. The eccentric action of hybrid rotary control valve 10 causes valve plug assembly 22 to leave abutting ring 66 of the valve seat 62 immediately upon disengaging, thereby allowing the flow of gases and liquids to begin passing through valve seat 62. The amount of gases or liquids passing through vane seat 62 relative to the position of valve plug assembly 22 determines the flow characteristic of hybrid rotary control valve 10. The amount of flow that can pass through valve seat 62 is dependent upon the position of offset sealing orifice 64 relative to the position of valve plug assembly 22.

Figure 6A:
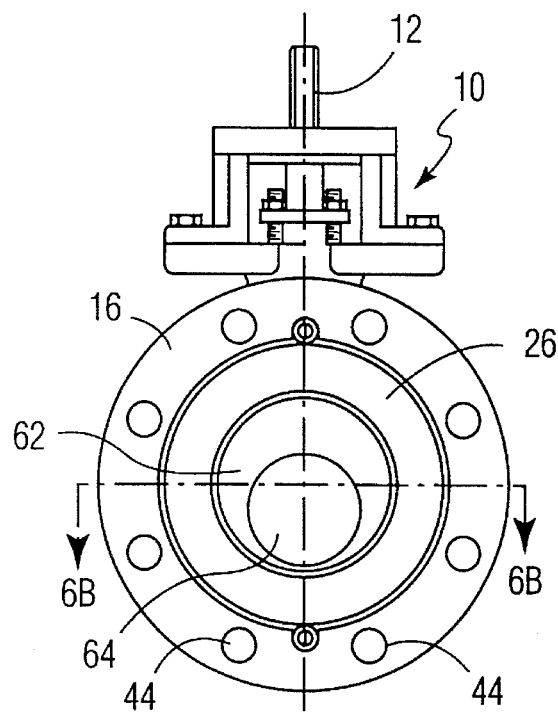
FIG. 6A is a cross-sectional view along line 6A—6A of FIG. 5 in which the constructed orifice of the valve seal is positioned at 180 degrees from the top of the flow channel.
Figure 6B:
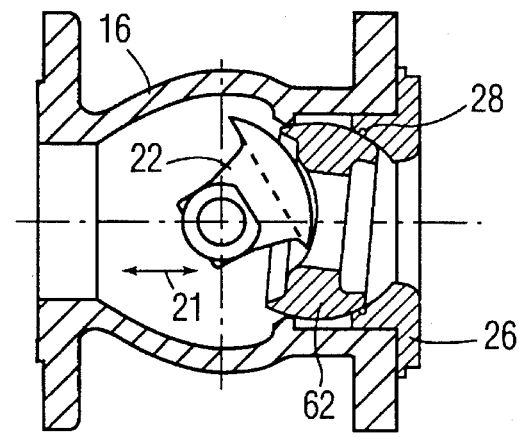
FIG. 6B is a cross-sectional view of the valve body along line 6B—6B of FIG. 6A.
Figure 6C:
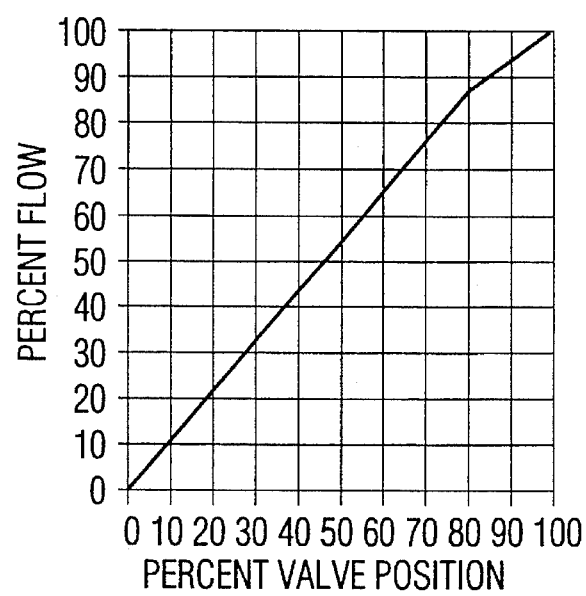
FIG. 6C is a flow characteristic graph plotting percent flow versus percent valve position for the embodiment shown in FIG. 5 when the orifice is at 180 degrees.

For example, referring to FIGS. 5 and 6 A through C, if valve seat orifice 64 is located 180 degrees from the top of flow channel 21 as shown, the result is a near or substantially linear flow characteristic as represented by the flow characteristic of FIG. 6C.

Referring to FIGS. 7 A through C, only a small amount of flow will be allowed to pass through valve seat 62 at the early stages of valve opening when valve seat orifice 64 is positioned 90 degrees from the top of flow channel 21. As valve plug assembly 22 continues towards the open position, a greater amount of orifice area will be exposed. The flow characteristic that results is a modified equal percentage, as represented by FIG. 7C.

Referring to FIGS. 8 A through C, there is shown valve seat orifice 64 located 270 degrees from the top of flow channel 21. As with the other examples of FIGS. 6 A through C and 7 A through C, flow through valve seat 62 begins as soon as control valve 10 starts to open. However, with valve seat orifice 64 located at 270 degrees, more orifice area is exposed sooner than if the valve seat orifice was located at 90 degrees (as shown in FIGS. 7 A through C). As a result, the valve will be quick opening, as represented by the flow characteristic of FIG. 8C.

The invention having been thus described with particular reference to the preferred forms thereof, it will be obvious that various changes and modifications may be made therein without departing from the spirit and scope of the invention as defined in the appended claims.

Wherefore, I claim:

1. A hybrid rotary control valve assembly which comprises:

a concentric valve body having a concentric valve chamber, a shaft disposed within said concentric valve chamber, and a flow channel disposed within a side wall of said concentric valve body;

an adjustable valve seat disposed about said flow channel wherein said adjustable valve seat has an orifice disposed therein; and an eccentric control valve plug assembly having a plug body and a plug head, said plug body having first and second end portions, wherein said first end portion of said plug body is disposed about said shaft, whose axis of rotation intersects with a centerline of said flow channel, and wherein said plug head is disposed about said second end portion of said plug body which is opposite to said shaft and in such a way that it is offset with respect to said centerline of said flow channel, wherein said plug head engages said adjustable valve seat in a liquid or gas tight relationship when in a closed position;

said plug head of said eccentric control valve including a symmetrical sealing surface that is offset with respect to said centerline of said flow channel.

2. The hybrid rotary control valve assembly of claim 1, wherein said axis of rotation of said shaft is centrally disposed within said concentric valve chamber.

3. The hybrid rotary control valve assembly of claim 1, wherein said plug head has a curved surface which is capable of engaging said adjustable valve seat in said fluid or gas tight relationship when said plug head is disposed at an angle relative to said centerline of said flow channel.

4. The hybrid rotary control valve assembly of claim 3, wherein said angle of said plug head relative to said centerline of said flow channel is an acute angle.

5. The hybrid rotary control valve assembly of claim 4, wherein said acute angle is about 1 degree to 60 degrees.

6. The hybrid rotary control valve assembly of claim 3, wherein said adjustable valve seat rotates orbitally about said flow channel so that said adjustable valve seat aligns with said eccentric control valve plug assembly.

7. The hybrid rotary control valve assembly of claim 3, further comprising a means for adjustably positioning said adjustable valve seat in correspondence with said plug head to compensate for the angled position of said plug head relative to said centerline of said flow channel.

8. The hybrid rotary control valve assembly of claim 7, wherein said means for adjustably positioning said adjustable valve seat includes a flexible ring disposed about an outer surface of said adjustable valve seat to adapt said adjustable valve seat to said angled position of said plug head.

9. The hybrid rotary control valve assembly of claim 8, wherein said means for adjustably positioning said adjustable valve seat includes a retainer disposed about an exterior side of said flexible ring to support said flexible ring against said adjustable valve seat.

10. The hybrid rotary control valve assembly of claim 3, further comprising a means for dynamically adjusting said adjustable valve seat when said plug head engages said adjustable valve seat in said fluid or gas tight relationship.

11. The hybrid rotary control valve assembly of claim 10, wherein said means for dynamically adjusting said adjustable valve seat includes a flexible ring disposed about an outer surface of said adjustable valve seat to continually support and adjust said adjustable valve seat whenever said plug head engages said adjustable valve seat.

12. The hybrid rotary control valve assembly of claim 11, wherein said means for adjustably positioning said adjustable valve seat includes a retainer disposed about an exterior side of said flexible ring to support said flexible ring against said adjustable valve seat.

13. The hybrid rotary control valve assembly of claim 1, wherein said orifice of said adjustable valve seat is offset with respect to the centerpoint of said adjustable valve seat to provide a particular flow characteristic of the fluid or gas passing through said concentric valve chamber.

14. The hybrid rotary control valve assembly of claim 13, wherein said adjustable valve seat rotates axially about said flow channel to change the position of said orifice relative the center of said adjustable valve seat to provide a plurality of possible flow characteristics of the fluid or gas passing through said concentric valve chamber.

15. The hybrid rotary control valve assembly of claim 1, further comprising a means for rotating said shaft such that said plug head of said eccentric control valve plug assembly either engages or disengages said adjustable valve seat.

16. The hybrid rotary control valve assembly of claim 15, wherein said means for rotating said shaft is an actuator controlled by either hydraulic means, mechanical means, electrical means or a combination thereof.

17. The hybrid rotary control valve assembly of claim 15, wherein said plug head engages or disengages from said adjustable valve seat with the application of a torque by said means for rotating said shaft in an amount that is less than a torque required for a non-adjustable valve seat.

18. The hybrid rotary control valve assembly of claim 1, wherein said symmetrical sealing surface of said plug head is spherical.

* * * * *